US012594865B2

(12) United States Patent
Eckenroth

(10) Patent No.: US 12,594,865 B2
(45) Date of Patent: Apr. 7, 2026

(54) ADJUSTMENT DEVICE FOR A SEAT

(71) Applicant: AUDI AG, Ingolstadt (DE)

(72) Inventor: Dirk Eckenroth, Eitensheim (DE)

(73) Assignee: AUDI AG, Ingolstadt (DE)

( * ) Notice: Subject to any disclaimer, the term of this patent is extended or adjusted under 35 U.S.C. 154(b) by 154 days.

(21) Appl. No.: 18/727,356

(22) PCT Filed: Jan. 12, 2023

(86) PCT No.: PCT/EP2023/050661

§ 371 (c)(1),
(2) Date: Jul. 9, 2024

(87) PCT Pub. No.: WO2023/147976

PCT Pub. Date: Aug. 10, 2023

(65) Prior Publication Data

US 2025/0089897 A1 Mar. 20, 2025

(30) Foreign Application Priority Data

Feb. 7, 2022 (DE) ..................... 10 2022 102 739.2

(51) Int. Cl.
*B60N 2/62* (2006.01)
*A47C 7/14* (2006.01)
(Continued)

(52) U.S. Cl.
CPC .............. *B60N 2/62* (2013.01); *A47C 7/144* (2018.08); *B60N 2/0284* (2013.01); *B60N 2/995* (2018.02)

(58) Field of Classification Search
CPC ......... B60N 2/62; B60N 2/0284; B60N 2/995
See application file for complete search history.

(56) References Cited

U.S. PATENT DOCUMENTS

| | | | | |
|---|---|---|---|---|
| 5,806,910 A * | 9/1998 | DeRees | .................. | B60N 2/015 |
| | | | | 297/452.13 |
| 2008/0157577 A1* | 7/2008 | Lindsay | ............... | B60N 2/0235 |
| | | | | 297/284.11 |
| 2013/0320730 A1* | 12/2013 | Aselage | ............... | B60N 2/0284 |
| | | | | 297/337 |

FOREIGN PATENT DOCUMENTS

| | | |
|---|---|---|
| DE | 1529415 B1 | 11/1971 |
| DE | 4104697 A1 | 8/1992 |

(Continued)

OTHER PUBLICATIONS

International Preliminary Report on Patentability issued on Aug. 22, 2024, in corresponding International Application No. PCT/EP2023/050661, 10 pages.

(Continued)

*Primary Examiner* — David R Dunn
*Assistant Examiner* — Tania Abraham
(74) *Attorney, Agent, or Firm* — Maier & Maier, PLLC

(57) ABSTRACT

An adjustment device for a seat, which is designed as an extension of a seat plane of the seat. The adjustment device has a length-adjustable adjustment mechanism and at least one elastic tension element. The adjustment mechanism has a central winding roller, multiple sliding rollers, at least one front end part, and at least one rear end part. Each end part is connected to at least one sliding roller. A first end of the at least one tension element is fastened to the central winding roller. The at least one tension element, starting from the central winding roller, touches the sliding rollers. A second end of the at least one tension element is fastened to a fastening element of a supporting body of the seat plane.

20 Claims, 4 Drawing Sheets

(51) Int. Cl.
  *B60N 2/02*    (2006.01)
  *B60N 2/90*    (2018.01)

(56)     References Cited

FOREIGN PATENT DOCUMENTS

| | | | |
|---|---|---|---|
| DE | 29903389 | U1 | 5/1999 |
| DE | 102009019031 | A1 | 10/2010 |
| DE | 102009019032 | A1 | 10/2010 |
| DE | 102009019033 | A1 | 10/2010 |
| DE | 202012010860 | U1 | 12/2012 |
| DE | 102012101433 | A1 | 8/2013 |
| DE | 202019104366 | U1 | 8/2019 |
| JP | S5743713 | A | 3/1982 |
| JP | H06284940 | A | 10/1994 |
| JP | H0767743 | A | 3/1995 |

OTHER PUBLICATIONS

International Search Report and Written Opinion issued on Mar. 22, 2023 in corresponding International Application No. PCT/EP2023/050661; 16 pages.
Search Report issued on Nov. 1, 2023 in corresponding German Application No. 10 2022 102 739.2; 8 pages.

* cited by examiner

ADJUSTMENT DEVICE FOR A SEAT

FIELD

The invention relates to an adjustment device for a seat and a seat.

BACKGROUND

Publication DE 20 2019 104 366 U1 describes a vehicle seat.

An item of adjustable seating furniture is known from publication DE 1 529 415 B1.

An armchair is described in publication DE 20 2012 010 860 U1.

Against this background, one task was to improve the adjustment option for a seat.

SUMMARY

The adjustment device according to the invention is designed and/or provided for a seat and is furthermore designed as a length-adjustable extension of a seat plane which a person touches with their buttocks, at least their thighs and at least partially also with their lower legs, when they sit on the seat plane. This adjustment device has an adjustment mechanism that is length-adjustable or adjustable with respect to its length or adjustable and/or expandable, e.g., extendable or to be extended and shortenable or to be shortened. In addition, the adjustment device has at least one tension element. The adjustment mechanism of the adjustment device has as components a central winding roller for the at least one tension element, at least two or more sliding rollers, as well as at least one front end part and at least one rear end part. Each end part is connected to at least one sliding roller. Furthermore, a first end of the at least one tension element is fastened to the central winding roller. The at least one tension element is guided starting from the central winding roller in succession via the sliding rollers to the end parts and generally touches and/or encloses each of these sliding rollers at least tangentially, wherein the at least one tension element encloses an outer cylindrical shell of a respective sliding roller in one embodiment in an angular range of up to 90°, possibly up to a maximum of 120°, wherein the at least one tension element is at least tangentially guided along the respective sliding roller. In addition, a second end of the at least one tension element is fastened to a fastening element of a supporting body of the seat plane. The at least one tension element extends between the winding roller and the fastening element on the supporting body.

Furthermore, the winding roller is designed to wind or unwind the at least one tension element when a length of the adjustment mechanism is changed and/or adjusted. During such a change of the length, the at least one tension element slides and/or rolls on the sliding rollers and/or along the sliding rollers and is or will be stretched taut between the winding roller and the supporting body. When the length of the adjustment mechanism is changed and/or adjusted, it is either lengthened or shortened. Such an adjustment can be carried out automatically, for example, by at least one drive as a further component of the adjustment device. If the adjustment mechanism is extended, at least one tension element is unwound from the central winding roller. If, however, the adjustment mechanism is shortened, the at least one tension element is wound onto the central winding roller. It is possible in this case that at least one drive of the adjustment mechanism is coupled to a shaft of the central winding roller.

In one embodiment, the adjustment mechanism has at least one row made up of or having multiple arms. It is possible that the arms of the at least one row are arranged between a front and a rear end part, wherein the front and rear end parts continue a respective row of arms and/or delimit them at the front or rear. Alternatively or additionally, each two arms within each row are rotatably connected to one another via at least one rotating element. Alternatively or additionally, at least one end of each arm is also connected to a sliding roller, the cylindrical shell of which is also at least tangentially touched by the at least one tension element. It is possible that the at least one tension element stretched between the winding roller and the supporting body also slides and/or rolls on or on the sliding rollers or their cylindrical shells and between the ends of two arms of two rows when the length of the adjustment mechanism is changed. In this case, the at least one tension element not only touches the sliding rollers on the end parts, but also the sliding rollers at the ends of the arms.

In a further embodiment, the adjustment mechanism has, for example, two rows made up of multiple arms that are arranged parallel to one another. The adjustment mechanism has, per row, two front arms, i.e., a pair of front arms, and two rear arms, i.e., a pair of rear arms, between which at least two middle arms, i.e., at least a pair of middle arms, are arranged. It is possible for two adjacent arms of a row along a respective arm, for example largely in the middle of the respective arm, to be connected to one another and to be rotatable relative to one another via a rotating element. In one embodiment, it is possible that a row of several arms is designed and/or referred to as Nuremberg scissors, which are arranged in a length-adjustable manner between the front and rear connection parts.

In one embodiment, each end part, i.e., each front and each rear end part, has an upper and a lower end. In this case, an upper end of a respective front or rear end part and a lower end of a respective front and rear end part are connected to a sliding roller arranged thereon, wherein a sliding roller is arranged at each end of an end part. Each sliding roller is or will be at least tangent to the at least one tension element at the two ends of a respective end part.

Alternatively or additionally, it is possible for the adjustment device to have two front end parts arranged parallel to one another and two rear end parts arranged parallel to one another, wherein, for example, multiple first arms are arranged in a first row between a first front end part and a first rear end part and multiple second arms are arranged in a second row arranged parallel thereto between a second front end part and a second rear end part. In each case, two end parts of the two rows arranged parallel to one another are connected to one another via at least one sliding roller between the two rows.

Alternatively or additionally, at least one end of each arm is also connected to one and/or another sliding roller. It is also possible for a front arm of the respective row to be movably connected to a front end part via at least one rotating element and/or a sliding roller, for example rotatably and/or displaceably, for example via an elongated hole in the front end part. Correspondingly, it is possible for a rear arm of the respective row to be movably connected to a rear end part via at least one rotating element and/or a sliding roller, for example rotatably and/or displaceably, for example via an elongated hole in the rear end part. Alternatively or additionally, a sliding roller is connected to one end of a respective arm of a first row and to one end of a respective arm of a second row via a sliding roller, wherein sliding rollers which connect the ends of two arms of both rows are arranged between the two rows.

In one embodiment, the second end of the at least one tension element is fastened to the fastening element of the supporting body above or below the adjustment mechanism. It is possible that the at least one tension element, starting from a first fastening element on the central winding roller or a shaft of the winding roller, touches and/or encloses the sliding rollers between the end parts and the arms of the adjustment mechanism either clockwise or counterclockwise and ends at the second fastening element of the supporting body either above or below the adjustment mechanism.

In the embodiment, the upper ends of the two rear end parts are connected to one another via an upper sliding roller, the lower ends of the two rear end parts are connected to one another via a lower sliding roller, the lower ends of the two front end parts are connected to one another via a further lower sliding roller, and the upper ends of the two front end parts are connected to one another via a further upper sliding roller. Between these four sliding rollers, further sliding rollers are arranged between the ends of each arm. It is possible that the at least one tension element, starting from the central winding roller, is at least tangent to the four sliding rollers mentioned, for example, which are each arranged between two end elements and connect them, one after the other in a clockwise direction and ends above the adjustment mechanism on the fastening element of the supporting body. Alternatively thereto, it is possible for the at least one tension element to enclose the four sliding rollers at the end parts in a counterclockwise direction, starting from the winding roller, and to end at the fastening element of the supporting body below the adjustment mechanism. The at least one tension element is also tangent to the other sliding rollers between two arms one after the other, either clockwise or counterclockwise, according to a respective sequence.

In an embodiment, the at least one tension element is designed as a band, a cable, or a chain. It is possible that the adjustment device has two or more tension elements that enclose the sliding rollers and are arranged parallel to one another. The at least one tension element is arranged between the two rows of arms of the adjustment mechanism. Furthermore, the shafts of the central winding roller and the sliding rollers are arranged parallel to one another.

The adjustment device has as a further component at least one section or part of a cover of a cushion or for a cushion of the seat level. A first end of this cover is, for example, fastened to the supporting body of the seat level and/or connected thereto. Furthermore, a second end of this cover is fastened and/or connected to the at least one tension element, for example along a section of the at least one tension element, wherein the second end of the cover on the at least one tension element always has a minimum distance from the winding roller. When the length of the adjustment mechanism is changed, the second end of the cover moves with the tension element when it is either wound onto or unwound from the central winding roller. It is possible that the at least one tension element and/or the cover of the seat plane can be elastically deformable at least in sections or completely.

The seat according to the invention has an embodiment of the adjustment device presented, usually as a length-adjustable extension of the seat. In this case, it is possible that this seat is designed and/or intended for a vehicle, such as a motor vehicle.

The presented adjustment device or a corresponding seat adjustment mechanism combines or connects a seat depth adjustment (SDA) with a leg rest adjustment (LRA). In addition to a comfortable and gap-free support, a maximum support area can be provided for a person sitting on the seat. It is intended that the adjustment device, i.e., at least the adjustment mechanism, provides and/or comprises two functions with one kinematics, for example with at least one drive, wherein a gap-free support surface is created for the thighs and lower legs of the person sitting on the seat level. A structure of the adjustment device is relatively compact and simple in comparison to a separate seat depth adjustment and leg rest adjustment.

A roller system integrated into the adjustment device made up of the sliding rollers as well as the winding roller and the band as a variant of the at least one tension element is used as a carrier for the actual cushion. In one embodiment, all other tension elements, such as cables or chains, are also suitable as supports for the cushion. Furthermore, it is provided that the part of the cushion which is designed to support the lower legs initially extends predominantly forwards when the adjustment mechanism and thus the adjustment device are lengthened and only pivots upwards more strongly and/or is pivoted upwards by the adjustment device at the end of a movement, wherein a broad support for the lower legs is provided. The adjustment device, which can also be designed or referred to as a seat adjustment mechanism, is designed to wind and unwind the strap via the winding roller simultaneously with the adjustment movement. The central winding roller for winding or unwinding the band is subjected to a torque, wherein the band and thus also the cushion are kept taut. The seat depth can be increased using the adjustment device. Furthermore, the adjustment device enables a two-stage movement with an enlargement of a seat part or a seat surface and pivoting out of the footrest.

The adjustment device is designed in one embodiment as a seat adjustment mechanism for a vehicle seat. This makes it possible, among other things, to adjust the seat depth, which allows the seat to be enlarged forwards without a gap at a front edge of the seat, without creating a gap in the cushion or in a seat cushion. It is possible to extend the leg rest provided via the adjustment device as a separate part or extension of the seat level. It is possible to combine the seat depth adjustment and the leg rest adjustment by the adjustment mechanism in the same installation space.

It is apparent that the above-mentioned features and the features still to be explained hereinafter are usable not only in the particular specified combination but rather also in other combinations or alone, without leaving the scope of the present invention.

BRIEF DESCRIPTION OF THE FIGURES

The invention is illustrated schematically in the drawing on the basis of an embodiment, and will be described schematically and in detail with reference to the drawing.

DETAILED DESCRIPTION

The figures will be described coherently and comprehensively. Identical reference signs are assigned to the same components.

Figure 1:
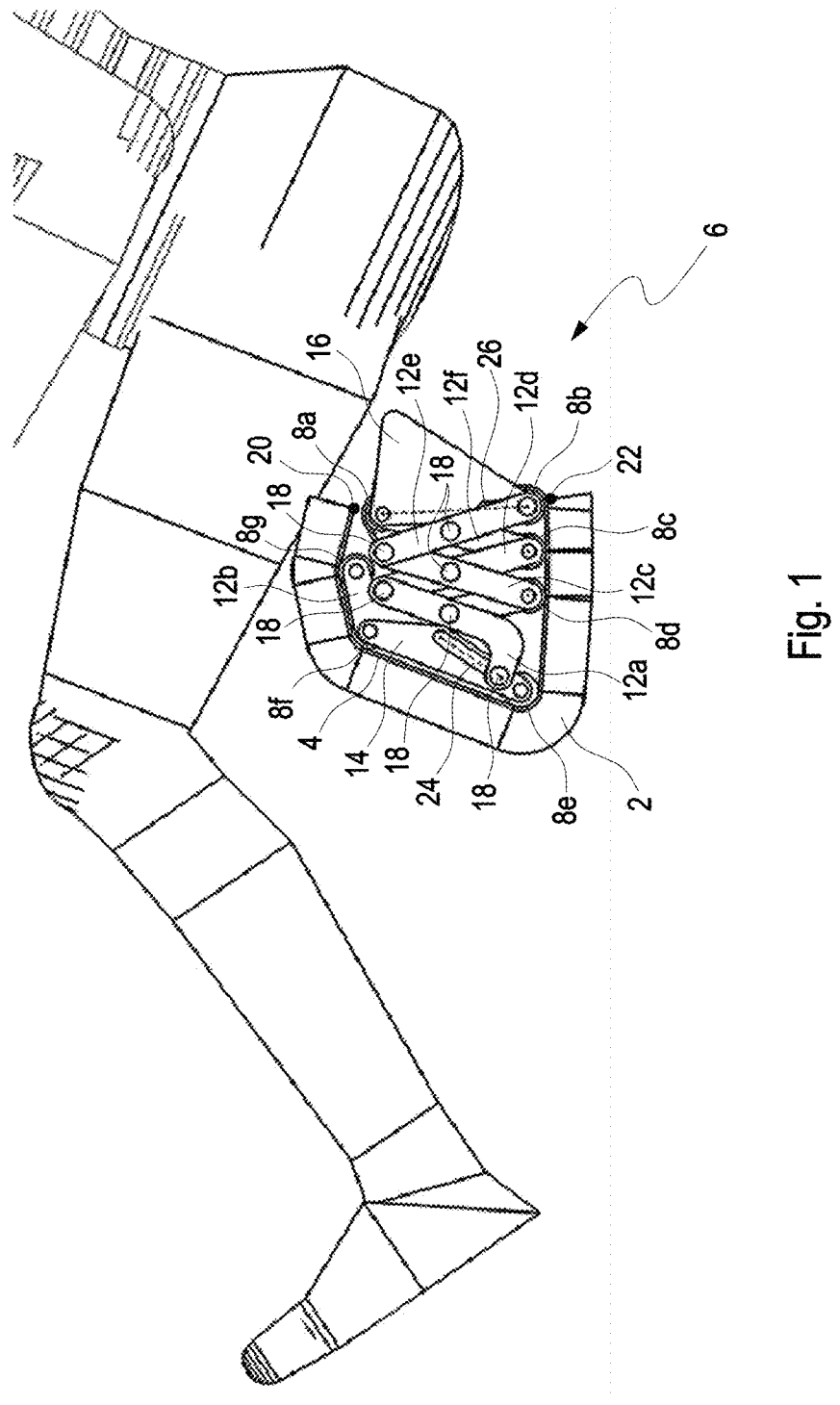
FIG. 1 shows an embodiment of the adjustment device according to the invention from a first perspective in a first position.
Figure 2:
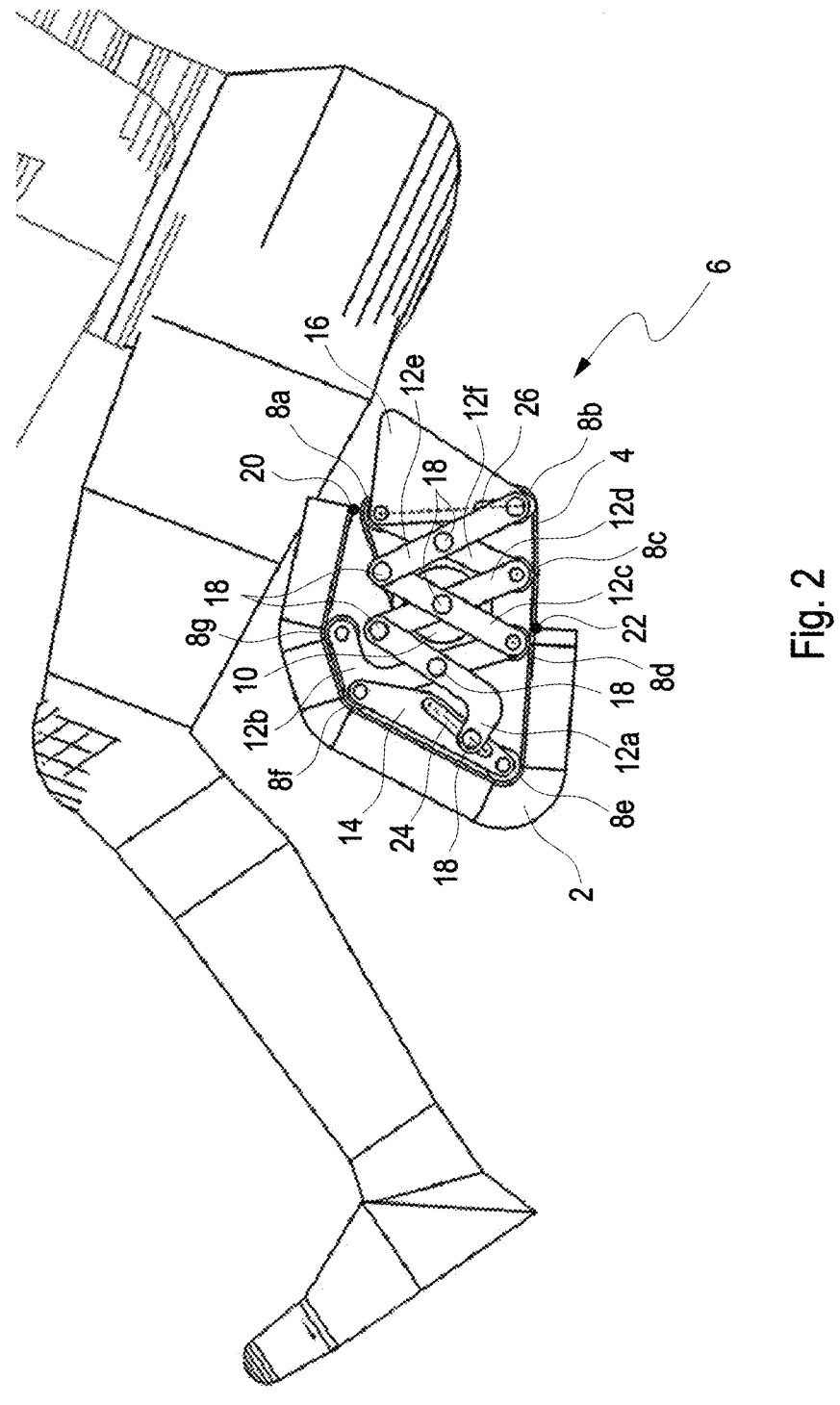
FIG. 2 shows an embodiment of the adjustment device according to the invention from a first perspective in a second position.
Figure 3:
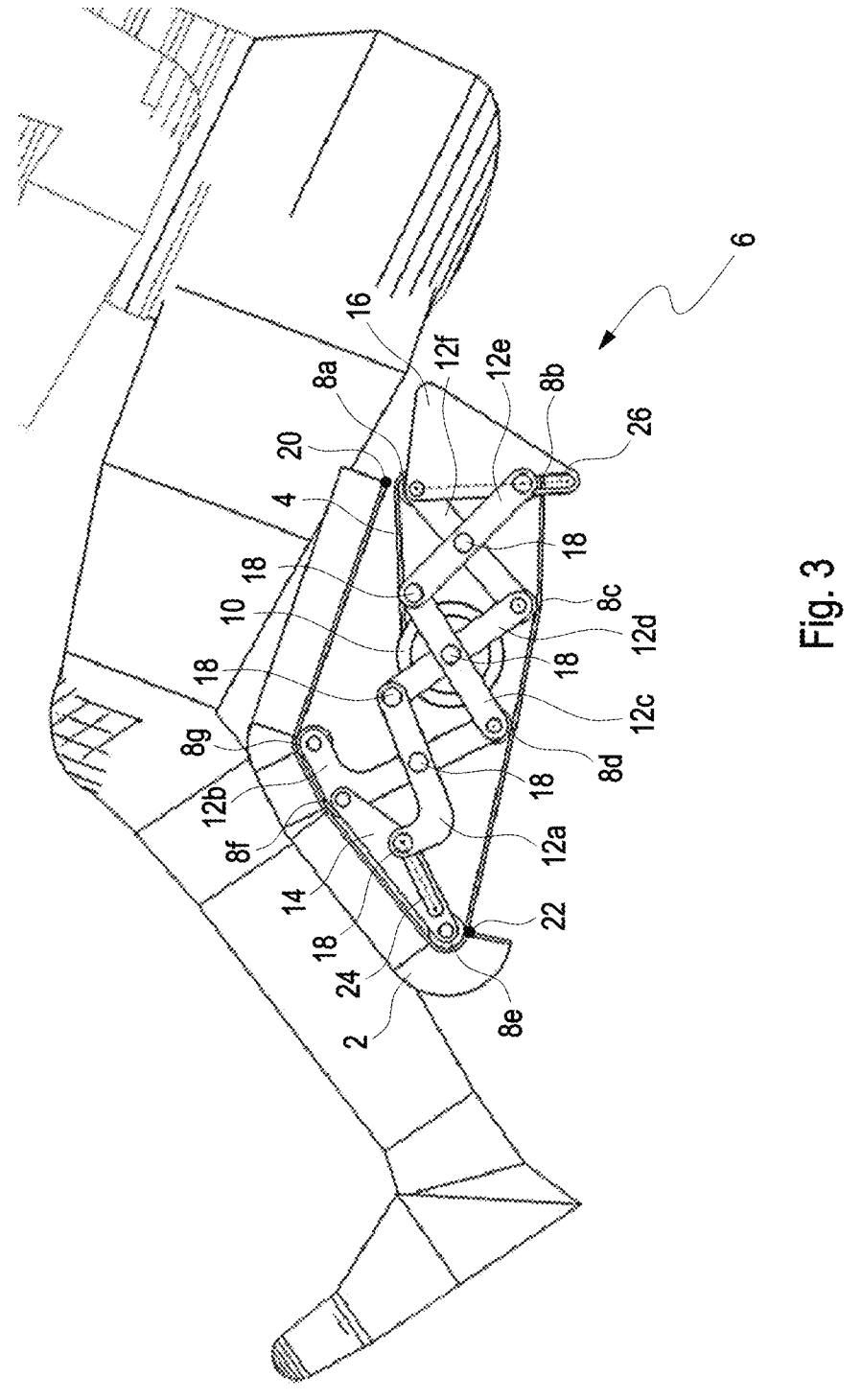
FIG. 3 shows an embodiment of the adjustment device according to the invention from a first perspective in a third position.

The embodiment of the adjustment device according to the invention, which is shown schematically in FIGS. 1 to 5, is designed as an extension for a seat plane of a seat, here a seat for a vehicle, for example for a motor vehicle. FIGS. 1 and 3 still show a leg and a foot of a person sitting on the seat.

The adjustment device presented has an adjustment mechanism 6, which is changeable or is to be changed with regard to its length and/or extent, wherein different positions are settable for the adjustment mechanism 6 and thus also for the adjustment device, in which different lengths are provided for the adjustment device. FIG. 1 shows the adjustment mechanism 6 in a retracted position, wherein the adjustment mechanism 6 and thus also the adjustment device has a minimal length. Only a thigh of the person touches the adjustment device. In contrast, the adjustment device in the position schematically shown in FIG. 2 is extended and thus lengthened in comparison to the position in FIG. 1. In the position shown in FIG. 3, the adjustment device is extended or lengthened even further than the position in FIG. 2 and in this case has a maximum length. Both the thigh and a lower leg of the leg of the person touch the adjustment device at the top and front.

The adjustment mechanism 6 here comprises two rows of arms 12a, 12b, 12c, 12d, 12e, 12f arranged parallel to one another and two end parts 14, 16, namely a front end part 14 and a rear end part 16, between which the arms 12a, 12b, 12c, 12d, 12e, 12f of a respective row are arranged. The arms 12a, 12b, 12c, 12d, 12e, 12f of a respective row are designed as Nuremberg scissors and/or are to be referred to as such and are movable or are to be moved relative to one another.

Furthermore, it is provided here that the rear end part 16, which is made triangular here, for example, faces toward a supporting body (not shown in more detail here) of the seat plane of the seat and is connected to or fastened thereto. The rear end part 16 has an elongated hole 26 which extends upwards starting from a lower end of the rear end part 16. In contrast, a front end part 14 faces away from the supporting body and is made triangular, here like a triangle having an obtuse angle. Furthermore, it is provided here that the front end part 14 has an elongated hole 24 which extends upwards from a lower end in the direction of a center of the front end part 14.

In the embodiment presented here, the adjustment mechanism 6 comprises two front arms 12a, 12b, two middle arms 12c, 12d, and two rear arms 12e, 12f per row. In addition, the adjustment device here has, clockwise in succession, a first sliding roller 8a, a second sliding roller 8b, a third sliding roller 8c, a fourth sliding roller 8d, a fifth sliding roller 8e, a sixth sliding roller 8f, and a seventh sliding roller 8g, which are assigned to the adjustment mechanism 6.

In the embodiment of the adjustment device presented here, a lower end of the front end part 14 is connected to the fifth sliding roller 8e and an upper end of the front end part 14 is connected to the sixth sliding roller 8f, wherein ends of the front end parts 14 of both rows are connected to one another via the respective sliding roller 8e, 8f, usually a shaft of the respective sliding roller 8e, 8f, which is arranged between the two front end parts 14 of both rows, wherein the lower ends of the front end parts 14 are connected to one another via the fifth sliding roller 8e and the upper ends of the two front end parts 14 are connected to one another via the sixth sliding roller 8f. Accordingly, a lower end of the rear end part 16 is connected to the second sliding roller 8b and an upper end of the rear end part 16 to the first sliding roller 8a, wherein ends of the rear end parts 16 of both rows are connected to one another via the respective sliding roller 8a, 8b, usually a shaft of the respective sliding roller 8a, 8b, which is arranged between the two rear end parts 16 of both rows, wherein the lower ends of the rear end parts 16 are connected to one another via the second sliding roller 8b and the upper ends of the two rear end parts 16 are connected to one another via the first sliding roller 8a.

Directly behind the front end part 14, two front arms 12a, 12b, which are bent here and, depending on the definition, L-shaped, are arranged in a row. Each of these two front arms 12a, 12b has a long section and a short section, wherein these two sections are oriented or arranged at an angle of 90° to one another. Approximately in the middle of the longer section of the respective front arm 12a, 12b, these two arms 12a, 12b are rotatably connected to one another via a rotating element 18. Furthermore, one end of a short section of the first front arm 12a is also displaceable or is to be displaced along the elongated hole 24 and thus also relative to the front end part 14 via a rotating element 18, which is arranged movably in the elongated hole 24 of the front end part 14 here.

One end of the long section of the first front arm 12a is rotatably connected via a rotating element 18 to an upper end of a second middle arm 12d of the respective row. Furthermore, a bend between the two sections of the second front arm 12b is rotatably connected to the upper end of the front end part 14 and to the sixth sliding roller 8f or its shaft, which is also rotatably connected to the bends between the two sections of the second front arms 12b of both rows. One end of the long section of the second front arm 12b is rotatably connected here to a first lower end of a first middle arm 12c of a respective row via the fourth sliding roller 8d, wherein this fourth sliding roller 8d rotatably connects each of the two lower ends of the second front and the first middle arm 12b, 12c of both rows. One end of the short section of the second front arm 12b of a first of the two rows is correspondingly rotatably connected to one end of the short section of the second front arm 12b of a second of the two rows via the seventh sliding roller 8g or its shaft.

The two straight middle arms 12c, 12d of a respective row are connected to one another approximately at their center via a shaft of a central winding roller 10, wherein the central winding roller 10 is arranged between the middle straight arms 12c, 12d of both rows and connects the two rows, wherein the two middle arms 12c, 12d of the respective row are rotatable relative to one another around the shaft of the central winding roller 10. An upper end of the first middle arm 12c and an upper end of a first rear arm 12e of each row are rotatably connected to one another via a rotating element 18. In addition, the central winding roller 10 is surrounded and/or enclosed by the sliding rollers 8a, 8b, 8c, 8d, 8e, 8f, 8g arranged around it, wherein shafts of the winding roller 10 and the sliding rollers 8a, 8b, 8c, 8d, 8e, 8f, 8g are arranged parallel to one another.

A lower end of the second middle arm 12d and a lower end of a second rear arm 12f of each row are rotatably connected to one another via the third sliding roller 8c or its shaft, wherein this third sliding roller 8c also connects each of the lower ends of the two arms 12d, 12f of both rows to one another and is arranged between the two rows.

The two rear arms 12e, 12f of a respective row are rotatably connected to one another approximately in the center via a rotating element 18. A lower end of the first straight rear arm 12e of a respective row is connected to the rear end part 16 via a shaft of the second rotating roller 8b and is displaceable or to be displaced along the elongated hole 26 relative to the rear end part 16. Furthermore, the second rotating roller 8b connects the first rear arm 12e and the rear end part 16 of both rows and is arranged accordingly between the two rows. Furthermore, an upper end of a second straight rear arm 12f is rotatably connected to an upper end of the rear end part 16 via a shaft of the first sliding roller 8a. It is also provided that the first sliding roller 8a is arranged between the upper ends of the second rear arm 12f and the rear end part 16 of a respective row and rotatably connects them.

In addition, the adjustment device has two tension elements, designed here as bands 4, which are arranged between the two rows of arms 12a, 12b, 12c, 12d, 12e, 12f and end parts 14, 16, wherein a first end of each band 4 is fastened to the winding roller 10. A second end of the respective band 4 is connected to the supporting body via a fastening element 20, wherein the respective band 4 here encloses all the sliding rollers 8a, 8b, 8c, 8d, 8e, 8f, 8g starting from the winding roller 10 up to the fastening element 20 in a clockwise direction.

It is provided that both bands 4 are designed as supports for a cover 2 of a cushion of the seat plane, wherein a first end of the cover 2 of the cushion is connected or fastened via at least one further fastening element 22 to a band 4 on which this at least one further fastening element 22 is arranged. A further second end of the cover 2 is connected or fastened to the supporting body of the seat plane and the second end of the respective band 4 via the at least one fastening element 20, to which the at least one band 4 is also connected.

The embodiment of the adjustment device presented here is designed as a leg rest for the thighs and lower legs of the person sitting on the seat. An integrated roller system made up of the sliding rollers 8a, 8b, 8c, 8d, 8e, 8f, 8g and the winding roller 10 and the bands 4 is used as the support for the cover 2 and thus for the cushion. As an alternative to the embodiment shown here, instead of a respective band 4, all other tension elements, such as cables or chains, are also suitable as supports for the cushion.

For the operation of the adjustment device, reference is made to the three possible states which are indicated in FIGS. 1 to 3, wherein FIG. 1 shows the adjustment device in a retracted first setting or position, wherein the adjustment device, depending on the definition, merely terminates the seating plane of the seat to the front and delimits it accordingly. In contrast, FIG. 3 shows the adjustment device in an extended third setting position, wherein it is used or can be employed as an extension or extending lengthening of the seat plane and as a leg rest. FIG. 2 shows the adjustment device in a possible second setting or position for enlarging the seat depth of the seat plane between the two retracted and extended or first and second positions shown in FIGS. 1 and 3. When operating the adjustment device for adjusting the seat, it is provided that that part or section of the cover 2 or the cushion which is intended to support the lower legs initially extends predominantly forwards starting from the first position and only pivots upwards more strongly starting from the second position at the end or conclusion of a movement carried out or possible in the process in order to provide a broad support for the lower legs in the third position.

Figure 4:
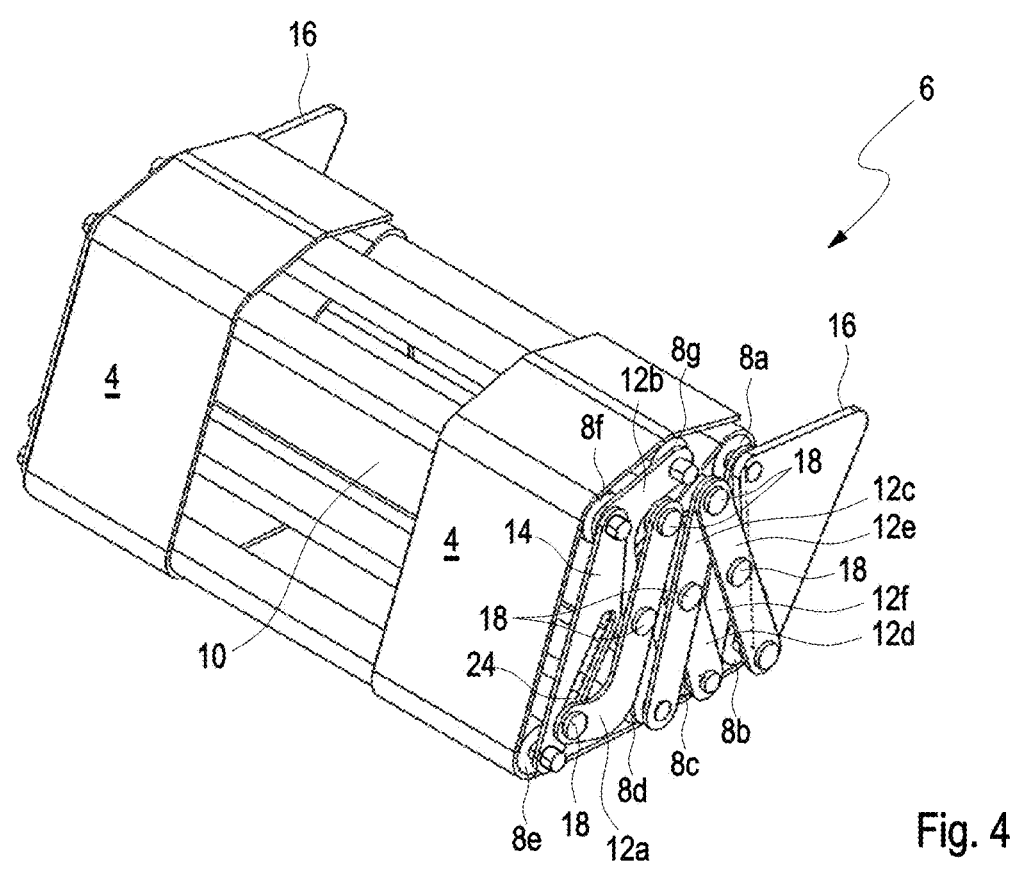
FIG. 4 shows the embodiment of the adjustment device according to the invention from a further perspective in a schematic representation.
Figure 5:
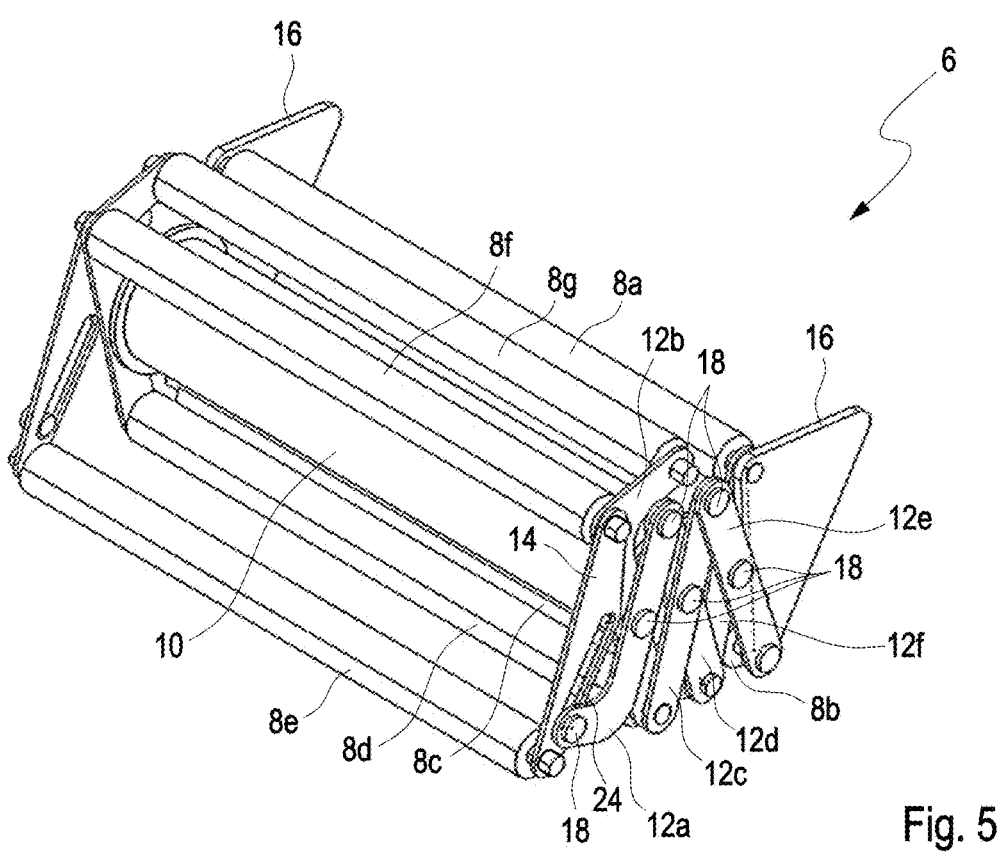
FIG. 5 shows the embodiment of the adjustment device according to the invention from a further perspective in a schematic representation.

Furthermore, FIG. 4 shows the adjustment device without cover 2 for the cushion from the second perspective. FIG. 5 shows the adjustment device without the two bands 4 and thus only the adjustment mechanism 6 and some of the sliding rollers 8a, 8b, 8c, 8d, 8e, 8f, 8g.

When the adjustment device is extended and/or lengthened from the first position to the second and/or third position, the winding roller 10 is designed to unwind the bands 4 and to enlarge a part or section of the respective band 4 arranged outside the winding roller 10. Vice versa, when the adjustment device is retracted and/or shortened from the third position to the second and/or first position, the winding roller 10 is designed to wind the bands 4 and to shrink a part or section of the respective band 4 arranged outside the winding roller 10.

In order to move the adjustment device and thereby change the length of the adjustment device depending on the position, the adjustment device has at least one electrical and/or mechanical, for example automatic, drive (not shown in more detail), which is connected to the winding roller 10 and/or at least one arm 12a, 12b, 12c, 12d, 12e, 12f and/or at least one end part 14, 16 of the adjustment mechanism 6 and is designed to rotate the winding roller 10 and/or to change a length of the adjustment mechanism 6. Alternatively or additionally, the central winding roller 10 for winding and unwinding the bands 4 is subjected to a torque, for example via an elastic component, such as a spring, wherein this elastic component is designed to keep the bands 4 and also the cover 2 for the cushion taut. During a respective movement to change the length of the adjustment device between each two positions, a band 4 slides and/or rolls on or along the sliding rollers 8a, 8b, 8c, 8d, 8e, 8f, 8g and moves relative to the sliding rollers 8a, 8b, 8c, 8d, 8e, 8f, 8g.

The embodiment of the adjustment device described here changes a surface of the cushion for the thighs and lower legs of the person during operation and at the same time provides a function for adjusting the seat depth and, when extended further, also a function for providing a support for the lower legs, without creating a gap in the seat or in the correspondingly length-adjusted seat plane between the positions.

LIST OF REFERENCE SIGNS

2 cover
4 band
6 adjustment mechanism
8a, 8b roller
8c, 8d
8e, 8f,
8g
10 winding roller
12a, 12b arm
12c, 12d
12e, 12f
14, 16 end part
18 rotating element
20, 22 fastening element
24, 26 elongated hole

The invention claimed is:

1. An adjustment device for a seat, which is designed as an extension of a seat plane of the seat, comprising: a length-adjustable adjustment mechanism and at least one elastic tension element, wherein the adjustment mechanism has a central winding roller, multiple sliding rollers, at least one front end part, and at least one rear end part, wherein each end part is connected to at least one sliding roller, wherein a first end of the at least one tension element is fastened to the central winding roller, wherein the at least one tension element, starting from the central winding roller, touches the sliding rollers, wherein a second end of the at least one tension element is fastened to a fastening element of a supporting body of the seat plane.

2. The adjustment device according to claim 1, wherein the end parts delimit the adjustment mechanism, wherein the winding roller is designed to wind or unwind the at least one tension element when a length of the adjustment mechanism is changed, wherein the at least one tension element slides on the sliding rollers.

3. The adjustment device according to claim 2, wherein the adjustment mechanism has at least one row made up of multiple arms, wherein the arms of the at least one row are arranged between a front and a rear end part, and/or in which each two arms are connected to one another via at least one rotating element, and/or in which at least one end of each arm is connected to a sliding roller.

4. The adjustment device according to claim 2, wherein each end part has an upper and a lower end, wherein each upper end and each lower end of a respective end part is connected to a sliding roller, and/or in which two front end parts and two rear end parts are arranged parallel to one another and are each connected to one another via at least one sliding roller.

5. The adjustment device according to claim 2, wherein the at least one tension element is designed as a band.

6. The adjustment device according to claim 2, wherein one end of a cover of the seat plane is fastened to the at least one tension element.

7. The adjustment device according to claim 1, wherein the adjustment mechanism has at least one row made up of multiple arms, wherein the arms of the at least one row are arranged between a front and a rear end part, and/or in which each two arms are connected to one another via at least one rotating element, and/or in which at least one end of each arm is connected to a sliding roller.

8. The adjustment device according to claim 7, wherein the adjustment mechanism has two rows of multiple arms arranged parallel to one another, which are arranged between two end parts, and/or in which a respective sliding roller connects respective ends of two arms of a first row and a second row.

9. The adjustment device according to claim 8, wherein each end part has an upper and a lower end, wherein each upper end and each lower end of a respective end part is connected to a sliding roller, and/or in which two front end parts and two rear end parts are arranged parallel to one another and are each connected to one another via at least one sliding roller.

10. The adjustment device according to claim 8, wherein the at least one tension element is designed as a band.

11. The adjustment device according to claim 8, wherein one end of a cover of the seat plane is fastened to the at least one tension element.

12. The adjustment device according to claim 7, wherein each end part has an upper and a lower end, wherein each upper end and each lower end of a respective end part is connected to a sliding roller, and/or in which two front end parts and two rear end parts are arranged parallel to one another and are each connected to one another via at least one sliding roller.

13. The adjustment device according to claim 7, wherein the at least one tension element is designed as a band.

14. The adjustment device according to claim 7, wherein one end of a cover of the seat plane is fastened to the at least one tension element.

15. The adjustment device according to claim 1, wherein each end part has an upper and a lower end, wherein each upper end and each lower end of a respective end part is connected to a sliding roller, and/or in which two front end parts and two rear end parts are arranged parallel to one another and are each connected to one another via at least one sliding roller.

16. The adjustment device according to claim 15, wherein the at least one tension element is designed as a band.

17. The adjustment device according to claim 1, wherein the at least one tension element is designed as a band.

18. The adjustment device according to claim 1, wherein one end of a cover of the seat plane is fastened to the at least one tension element.

19. A seat having an adjustment device according to claim 1.

20. The seat according to claim 19, which is intended for a vehicle.

* * * * *